(12) United States Patent
Gangadhar et al.

(10) Patent No.: US 9,414,282 B2
(45) Date of Patent: Aug. 9, 2016

(54) LINK MANAGEMENT IN A WIRELESS NETWORK ENVIRONMENT

(71) Applicant: Time Warner Cable Enterprises LLC, New York, NY (US)

(72) Inventors: Rajesh Gangadhar, Ashburn, VA (US); Praveen Srivastava, Ashburn, VA (US); Sourabh Gupta, Ashburn, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 177 days.

(21) Appl. No.: 14/107,459

(22) Filed: Dec. 16, 2013

(65) Prior Publication Data

US 2015/0172985 A1 Jun. 18, 2015

(51) Int. Cl.
*H04W 36/22* (2009.01)
*H04W 36/08* (2009.01)
*H04W 4/02* (2009.01)
*H04W 28/08* (2009.01)
*H04W 36/38* (2009.01)

(52) U.S. Cl.
CPC .............. *H04W 36/22* (2013.01); *H04W 4/02* (2013.01); *H04W 28/08* (2013.01); *H04W 36/08* (2013.01); *H04W 36/38* (2013.01)

(58) Field of Classification Search
CPC ... H04W 36/08; H04W 38/165; H04W 36/22; H04W 36/30; H04W 36/38; H04W 36/385; H04W 88/12
See application file for complete search history.

(56) References Cited

U.S. PATENT DOCUMENTS

| | | | | |
|---|---|---|---|---|
| 2012/0008595 A1* | 1/2012 | Wang | ............................ | 370/331 |
| 2012/0300746 A1* | 11/2012 | Ibrahim et al. | ........ | H04W 36/30 370/331 |
| 2013/0259005 A1* | 10/2013 | Kulkarni | ....................... | 370/332 |
| 2013/0301617 A1* | 11/2013 | Kuhn et al. | .................... | 370/331 |

* cited by examiner

*Primary Examiner* — Pao Sinkantarakorn
(74) *Attorney, Agent, or Firm* — Chapin IP Law, LLC

(57) ABSTRACT

A mobile computer device establishes a wireless communication link between the mobile computer device and a first access point of multiple access points in a network environment. While wirelessly connected to the first access point, the mobile computer device monitors communications from a set of neighboring access points including at least a second access point of the multiple access points. The mobile computer device transmits performance information derived from the monitored communications to a controller resource. To alleviate a current load on the first access point, the controller resource generates control information to terminate the wireless communication link between the mobile computer device and the first access point and establish a replacement wireless communication link between the mobile computer device and a second access point.

29 Claims, 9 Drawing Sheets

STATUS
INFORMATION
185

| ACCESS POINT | NUMBER OF MCDS |
|---|---|
| ACCESS POINT 120-1 | 8 |
| ACCESS POINT 120-2 | 1 |
| ACCESS POINT 120-3 | 4 |
| ACCESS POINT 120-4 | 3 |
| ACCESS POINT 120-5 | 4 |

PERFORMANCE
INFORMATION
350

PMI #1......(ACCESS POINT 120-1)
PMI #2......(ACCESS POINT 120-2)
PMI #3......(ACCESS POINT 120-4)
PMI #4......(ACCESS POINT 120-4)
PMI #5......(ACCESS POINT 120-5)
•••

FIG. 4

STATUS INFORMATION
185

| ACCESS POINT | NUMBER OF MCDS |
|---|---|
| ACCESS POINT 120-1 | 7 |
| ACCESS POINT 120-2 | 2 |
| ACCESS POINT 120-3 | 4 |
| ACCESS POINT 120-4 | 3 |
| ACCESS POINT 120-5 | 4 |

LINK MANAGEMENT IN A WIRELESS NETWORK ENVIRONMENT

BACKGROUND

Wi-Fi™ technology is defined by specifications from the Institute of Electrical and Electronics Engineers (IEEE) 802.11 standards. In general, Wi-Fi™ technology enables computerized devices such as laptop computers, mobile phones, tablet computers, etc., to wirelessly connect to a corresponding computer network. Via a respective wireless link, computer devices can retrieve data over a network such as the Internet.

Conventional computer devices typically have the ability to identify a presence of WiFi™ access points in a corresponding network environment. For example, according to current Wi-Fi™ technology, and a passive scanning technique, each of the access points in a network environment transmits a beacon signal indicating its presence. The mobile computer devices monitor the region for beacons (i.e., wireless signals as generated by the access points) to determine which, if any, access points are present in the region. The mobile computer device selects a suitable access point amongst the multiple access points to establish a WiFi™ connection.

WiFi™ technology also can support an active scanning technique. In accordance with the active scanning technique, to learn of one or more access points in a region, a computer device can broadcast a wireless query signal in the network environment. In response to receiving the wireless query signal, any of one or more active WiFi™ network access points in the region will respond with information indicating their identities. The querying computer device receives and processes the responses. Via the response information from the access points, the operator of the computer can identify which, if any, WiFi™ access points are present in the region.

In certain instances, after identifying one or more publicly available WiFi™ networks, the computer device can be configured to initiate display of the identities of the different WiFi™ networks on a display screen for viewing by a respective user of the computer device. In such an instance, the user of the computer can manually select from a listing of the available WiFi™ networks in which to connect.

An alternative type of communication network is a CDMA (Code Division Multiple Access) network. CDMA networks also enable corresponding computer devices to communicate over a network such as the Internet. However, in contrast to Wi-Fi™ technology, CDMA is known as a make-before-break type of handoff technology. In other words, during a respective handoff according to a cellular technology such as CDMA, a corresponding mobile phone device in communication with a first cellular tower establishes a wireless connection with a corresponding second cellular tower before dropping the corresponding link with the first cellular tower. Accordingly, communications over a corresponding CDMA type network are continuous and uninterrupted.

Unlike cellular telecommunication technologies (such as those based on CDMA technology) as discussed above, Wi-Fi™ does not have any specified handoff intelligence or protocols. This is because Wi-Fi was not designed or meant to be a mobility technology.

BRIEF DESCRIPTION OF EMBODIMENTS

Conventional wireless technologies suffer from deficiencies. For example, as discussed above, Wi-Fi™ technology is not designed to support handoffs from one access point to another. Instead, if a corresponding computer device detects that a first access point (to which the corresponding computer device is currently connected) no longer supports reliable communications, the corresponding computer device can initiate termination of the wireless link. Subsequent to termination, in a manner as discussed above, the corresponding computer device can scan the network environment again for other candidate access points. The corresponding computer device then selects amongst the candidate access points to establish a new wireless communication link. Typically, the corresponding computer device connects to an access point from which the strongest signal is received. Thus, in contrast to CDMA type technology, which supports make-before-break type of handoffs, Wi-Fi™ supports only make-after-break handoffs. In other words, WiFi™ is a type of network that requires the mobile computer device to drop a current wireless communication link before establishing a new one.

During usage of a Wi-Fi™ network, the user of the corresponding mobile computer device may move to a new location as they walk through a region including multiple access points. In such an instance, the computer device does not necessarily connect to a new access point unless a corresponding computer device is unable to communicate with the originally selected access point from which the strongest signal was originally received. In such an instance, when multiple computer devices operate in a similar manner (i.e., each of the computer devices connect to a corresponding access point from which a strongest signal is received and then move to a new location making the respective original connection less than optimal), this can result in an overall less than optimal use of corresponding access points in the network environment.

Embodiments herein deviate with respect to conventional techniques. For example, as an alternative to a mobile computer device making all decisions about which of multiple access points in which to connect, a respective network environment includes a controller resource. In one embodiment, the controller resource controls wireless connectivity between multiple mobile computer devices and the corresponding access points. By way of non-limiting example, the access points in the network environment may only support make-after-break type handoffs.

More specifically, in a further embodiment, a first mobile computer device in the network environment can be configured to establish a wireless communication link with a first access point. While the wireless communication link is active, the first mobile computer device can be configured to monitor communications from a set of neighboring access points located in a vicinity of the first mobile computer device and/or first access point. Assume in this example that the set of neighboring access points includes at least a second access point. Based on the monitored communications from the set of neighboring access points, the first mobile computer device produces performance information.

In one embodiment, the performance information (such as one or more performance metrics) indicate an ability of the first mobile computer device to receive communications from each of one or more corresponding neighboring access points. As a specific example, the first mobile computer device can produce first performance metric information indicating an ability of the first mobile computer device to receive communications from a second access point in the network environment; the first mobile computer device can produce second performance metric information indicating an ability of the first mobile computer device to receive communications from a third access point in the network environment; and so on. In this manner, the first mobile computer device can be configured to detect which of multiple possible neighboring access points provide a good wireless connection (at least on a wireless downlink from a respective access point to the first mobile computer device).

In accordance with yet further embodiments, the first mobile computer device transmits a notification (such as a report including the performance metrics) derived from the monitored communications to a controller resource that controls connectivity between the first mobile computer device and the multiple access points. The controller resource can be configured to control wireless connectivity amongst the multiple mobile computer devices and the multiple access points.

In a similar manner as discussed above for the first mobile computer device, each of the multiple computer devices in the network environment can be configured to monitor communications from neighboring access points and communicate corresponding performance metrics to the controller resource. Accordingly, the controller resource can be apprised of the different candidate access points to which each of the mobile computer devices can wirelessly connect.

Based on performance metrics received from each of the multiple computer devices, the controller resource makes decisions regarding which of the multiple access points each of the multiple computer devices is to wirelessly connect. In certain instances, the controller resource can cause one or more mobile computer devices to connect to a selected access point in the network environment.

In accordance with further embodiments, the controller resource can be configured to generate control information. The controller resource can be configured to communicate the control information to one or more mobile computer devices in the network environment. For example, in one embodiment, assume that the controller resource determines that the first mobile computer device initially connected to the first access point (or a collection of other mobile computer devices in the network environment) as discussed above would be better served via a wireless connection between the first mobile computer device and a second access point instead. To initiate a handoff, in response to receiving the performance information from the first mobile computer device, the controller resource generates control information indicating to: i) terminate the wireless communication link between the first mobile computer device and the first access point, and ii) establish a second wireless communication link between the first mobile computer device and the second access point. As discussed herein, this can be a make-after-break type of handoff.

In accordance with yet further embodiments, based on the generated control information, the controller resource produces and transmits a first command to the first access point. The first command notifies the first access point or first mobile computer device to terminate the first wireless communication link between the first mobile computer device in the first access point. The controller resource also produces and transmits a second command to the first mobile computer device. The second command notifies the first mobile computer device to establish the second wireless communication link (substitute wireless link or handoff link) between the first mobile communication device and the second access point. Accordingly, the controller resource overseeing multiple access points and corresponding mobile computer devices can be configured to force a handoff of a wireless communication link from a first access point to a second access point in a network that supports make-after-break type handoffs.

In one embodiment, to execute a make-after-break type of handoff as further discussed later in this specification, the controller resource communicates with a connection manager in the first mobile computer device. The connection manager participates in a respective handoff from a current access point (the first access point) to which the mobile computer device is connected to the second access point. As a more specific example, the controller resource can be configured to transmit the second command to the connection manager in the first mobile computer device over the first wireless communication link before the first wireless communication link is terminated. This ensures that the first mobile computer device is notified of a particular one of the multiple access points in which to connect prior to termination of the first wireless communication link.

Accordingly, in contrast to conventional techniques, embodiments herein enable a respective controller resource in a network environment to monitor and control wireless connectivity as well as provide better usage of available wireless bandwidth amongst multiple mobile computer devices.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Note that yet other embodiments herein include software programs to perform the operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, logic, instructions, and/or other data (e.g., data structures) arranged or encoded on a non-transitory computer readable storage medium such as an optical medium (e.g., CD-ROM), floppy disk, hard disk, memory stick, etc., or other media such as firmware in one or more ROM, RAM, PROM, etc., or as an Application Specific Integrated Circuit (ASIC), etc. The software, firmware, logic, etc., can be installed onto a computerized device to cause the computerized device to perform the operations explained herein.

Accordingly, embodiments herein are directed to a method, system, computer program product, etc., that supports operations as discussed herein.

One or more embodiment as discussed herein includes a computer readable storage medium and/or system having instructions stored thereon. The instructions, when executed by computer processor hardware, cause the computer processor hardware of the system to: establish a wireless communication link between the mobile computer device and a first access point of multiple access points in the network environment; monitor communications from a set of access points including at least a second access point of the multiple access points; and transmit a report of performance information derived from the monitored communications to a controller resource, the controller resource controlling connectivity between the mobile computer device and the multiple access points.

Yet another embodiment herein includes a computer readable storage medium and/or system having instructions stored thereon. The instructions, when executed by computer processor hardware, cause the computer processor hardware to: receive a report including performance information generated by a mobile computer device in wireless communication with a first access point in a network environment, the performance information indicating an ability of the mobile computer device to communicate with at least a second access point in the network environment; and in response to receiving the performance information, generate control information indicating to i) terminate a first wireless communication link between the mobile computer device and the first access point, and ii) establish a second wireless communication link between the mobile computer device and the second access point.

Note that the ordering of the operations can vary. For example, any of the processing operations as discussed herein can be performed in any suitable order.

Other embodiments of the present disclosure include software programs and/or respective hardware to perform any of the method embodiment operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or within a software application.

As discussed herein, techniques herein are well suited to control connectivity of multiple computer devices with multiple access points. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 2 is an example diagram illustrating status information indicating current wireless connectivity in a network environment according to embodiments herein.

FIG. 4 is an example diagram illustrating performance information according to embodiments herein.

FIG. 6 is an example diagram illustrating updated status information indicating a load distribution such as the number of mobile communication devices that are connected to each of multiple access points in a network environment according to embodiments herein.

Figure 1:
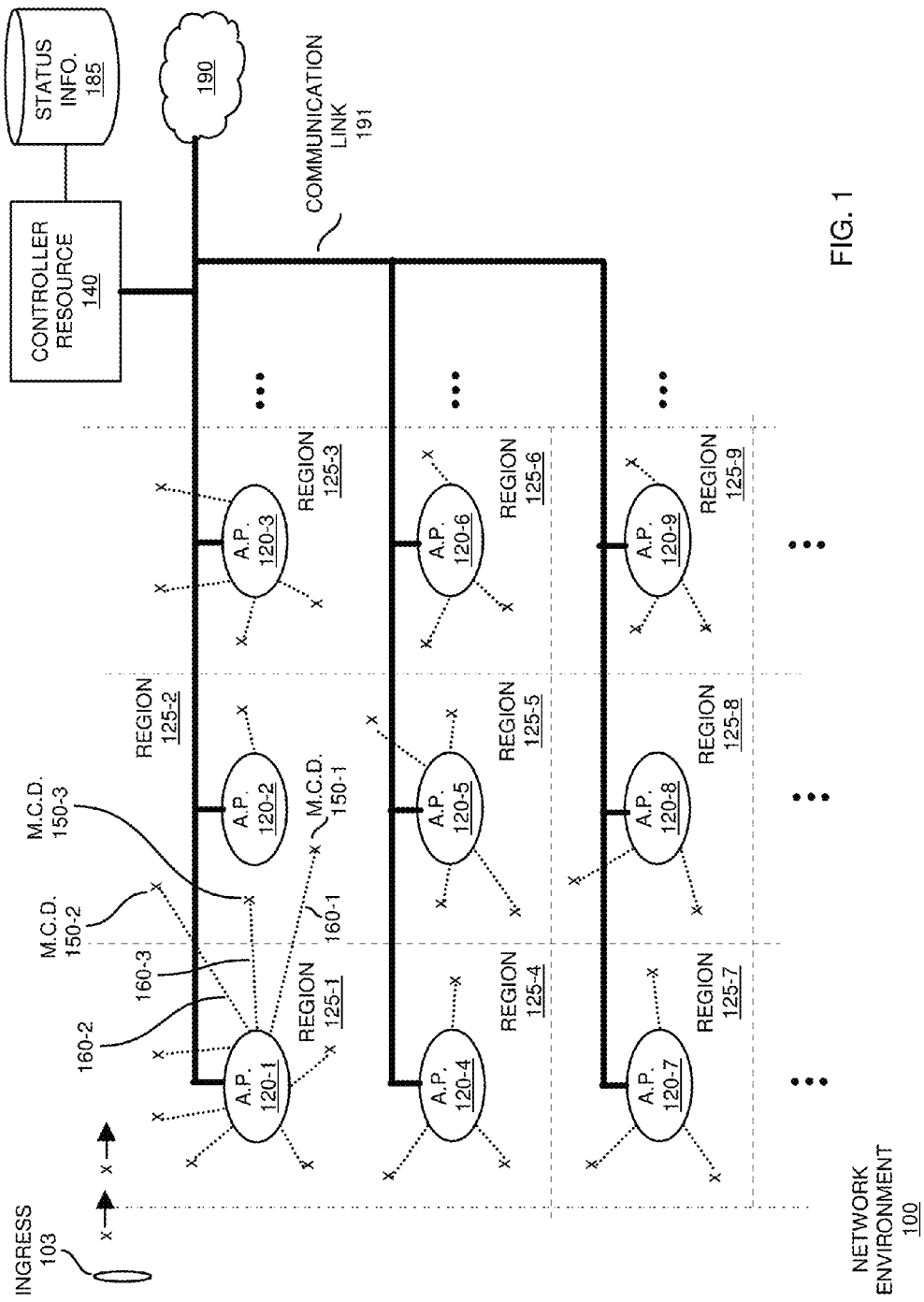
FIG. 1 is an example diagram illustrating a network environment including multiple access points in which a controller resource controls wireless connectivity according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

Now, more specifically, FIG. 1 is an example diagram illustrating a network environment including multiple access points in which a controller resource controls wireless connectivity in a network environment according to embodiments herein.

As shown, network environment 100 includes multiple access points 120 including access point 120-1, access point 120-2, access point 120-3, access point 120-4, access point 120-5, access point 120-6, access point 120-7, access point 120-8, access point 120-9, and so on. Network environment 100 can include any suitable number of access points 120.

In this example embodiment, network environment 100 additionally includes controller resource 140, shared communication link 191, network 190, etc. Network 190 and share communication link 191 can be configured to support communications according to any suitable communication protocol such as HTTP (Hypertext Transfer Protocol), UDP (User Datagram Protocol), etc.

In one embodiment, controller resource 140 is a central manager that manages connectivity between each of multiple mobile computer devices 150 and the multiple access points 120. Shared communication link 191 such as one or more interconnected hardwired or wireless links conveys communications enabling the controller resource 140 and the access points 120 to communicate with each other.

Shared communication link 191 and network 190 can include any suitable physical media such as one or more coaxial cables, optical fibers, twisted wire pairs, wireless links, etc., to provide connectivity.

In one embodiment, each of the access points 120 provides wireless coverage to corresponding mobile computer devices in a given region. For example, in one embodiment, access point 120-1 generally provides wireless connectivity to corresponding mobile computer devices located in region 125-1; access point 120-2 generally provides wireless connectivity to corresponding mobile computer devices located in region 125-2; access point 120-3 generally provides wireless connectivity to corresponding mobile computer devices located in region 125-3; and so on.

In FIG. 1, each 'X' represents a corresponding mobile computer device operated by a respective user. A respective dotted line between the X and a corresponding access point represents a corresponding wireless link between the mobile computer device and the corresponding access point to which the mobile computer device is wirelessly connected.

As mentioned above, each of the access points 120 can be configured to support communications in accordance with any suitable wireless communication protocol. In one non-limiting example embodiment, access points 120 can be configured to support communications via a Wi-Fi™ protocol or WiFi™ standard such as IEEE (Institute of Electrical and Electronics Engineers) 802.11a, 802.11b, 802.11g, 802.11n, etc.

In this example embodiment, mobile computer device 150-1 is connected to access point 120-1 via wireless communication link 160-1; mobile computer device 150-2 is connected to access point 120-1 via wireless communication link 160-2; mobile computer device 150-3 is connected to access point 120-1 via wireless communication link 160-3; and so on.

In general, as shown, controller resource 140 can be configured to control connectivity such that mobile computer devices located within the corresponding region are wirelessly connected to a corresponding access point that serves the region. For example, as mentioned, access point 120-1 can be configured to generally provide wireless connectivity to mobile computer devices located in region 125-1; access point 120-2 can be configured to generally provide wireless connectivity to mobile computer devices located in region 125-2; access point 120-3 can be configured to generally provide wireless connectivity to mobile computer devices located in region 125-3; and so on.

However, note that there may be instances in which access points provide a corresponding mobile computer device connectivity to shared communication link 191 even though the corresponding mobile computer device resides outside of the immediate area of coverage supported by the corresponding access point. For example, as shown, each of the mobile computer devices located within region 125-1 are wirelessly connected to access point 120-1. However, mobile computer devices 150-1, 150-2, and 150-3, are also wirelessly connected to access point 120-1, even though they are located in region 125-2. This may occur because the mobile computer devices 150-1, 150-2, and 150-3, connected to access point 120-1 as they passed through region 125-1. Such users may continue to walk to a target location in region 125-2. However, because the access point 120-1 still provides a sufficient link to mobile communication device 150-1, mobile communication device 150-2, and mobile communication device 150-3, such devices may not terminate their corresponding wireless communication link with access point 120-1.

As further discussed herein, controller resource 140 can be configured to perform a load-balancing function in which the controller resource 140 causes one or more make-after-break type handoffs of certain wireless communication links from one access point to another such that a given region such as served by access point 120-1 in this example is not overloaded with supporting too many mobile computer devices at the same time.

Via communications over a corresponding wireless communication link and shared communication link 191, each of the mobile computer devices is able to communicate with resources such as servers located in network 190 to retrieve or transmit content such as video data, audio data, webpages, documents, emails, and so on.

As a further example, note that network environment 100 can be configured to support client-server type communications. Assume that the mobile computer device 150-1 establishes a respective wireless communication link 160-1 with access point 120-1. As previously discussed, the mobile computer device 150-1 (independent of the controller resource 140) can be configured to establish the wireless communication link 160-1 in accordance with a Wi-Fi™ protocol. In such an instance, to facilitate communications, the mobile computer device 150-1 can be configured to notify the access point 120-1 of its corresponding unique identifier value such as its assigned network address. On behalf of the mobile computer device 150-1, the access point 120-1 acts as a proxy in to transmit and retrieve data over shared communication link 191 and network 190.

Assume further in this example that mobile communication device 150-1 generates a request for content from a server resource located in network 190. To retrieve the content, the mobile computer device 150-1 transmits the request over corresponding wireless communication link 160-1 to access point 120-1. On behalf of the mobile computer device 150-1, the access point 120-1 transmits a corresponding request for content to the appropriate server resource in network 190. In response to receiving a request for content, the server resource in network 190 transmits the requested content over network 190 through shared communication link 191 (resources in a packet-switched network) to access point 120-1. The access point 120-1 forwards the received content over the wireless communication link 160-1 to mobile computer device 150-1. In a similar manner, each of the mobile computer devices 150 in network environment 100 can retrieve or transmit data over network 190 and shared communication link 191.

As shown in FIG. 1, and as previously discussed, network environment 100 can include a grid of multiple access points 120 and corresponding regions 125 of service. In this example embodiment, assume that users operating one or more mobile computer devices 150 are forced to pass through ingress 103 (such as a door) in order to reach respective target destinations in network environment 100. By way of non-limiting example, network environment 100 can represent a top view of stadium seating, coffeehouse seating, restaurant seating, etc., in which each of the regions 125 includes multiple seats occupied by respective users. As mentioned, users of corresponding mobile computer devices 150 may establish wireless communication links while walking through a region 125-1 to a destination outside of region 125-1.

Assume in this example that a user of mobile computer device 150-1 establishes wireless communication link 160-1 as the corresponding user passes through region 120-1 to region 125-2; assume that a user of mobile computer device 150-2 establishes wireless communication link 160-2 as the corresponding user passes through region 125-1 to region 125-2; assume that a user of mobile computer device 150-3 establishes wireless communication link 160-3 as the corresponding user passes through region 125-1 to region 125-2; and so on.

In one embodiment, as wireless communication links are established by respective mobile computer devices with respect to access points in network environment 100, controller resource 140 keeps track of which of the mobile computer devices 150 are communicatively coupled with the different access points 120. In one embodiment, as shown in FIG. 2, controller resource 140 generates status information 185 indicating how many mobile computer devices 150 are wirelessly connected to each access point in network environment 100.

In this example embodiment, as indicated by status information 185, there are eight mobile computer devices wirelessly coupled to access point 120-1; there is one mobile computer device wirelessly coupled to access point 120-2; there are four mobile computer devices wirelessly connected to access point 120-3; and so on.

Note that the type of status information 185 shown in FIG. 2 is shown by way of non-limiting example. Status information 185 can include any suitable information regarding connectivity between mobile computer devices and access points.

Referring again to FIG. 1, this example indicates that access point 120-1 has a relatively heavy load of supporting eight mobile computer devices while access point 120-2 has a relatively light load of supporting one mobile computer device. This loading may be undesirable because users connecting to access point 120-1 may experience substantial congestion (i.e., data packet delays) while the access point 120-2 may have excess or unused wireless bandwidth that easily can be used to support additional users without degrading performance to the existing mobile computer device connected to access point 120-2.

As discussed more particularly in the following figures and corresponding text, each of the mobile computer devices can be configured to provide feedback (such as performance information, location information, etc.) to controller resource 140. Based on feedback from the multiple mobile computer devices, controller resource 140 communicates with access points and/or mobile computer devices to control which of the access points 120 each of the mobile computer devices is wirelessly connected. In accordance with further non-limiting example embodiments, the controller resource 140 can be configured to perform load-balancing such that none of the corresponding access points 120 in network environment 100 is overburdened with supporting too many mobile computer devices.

Figure 3:
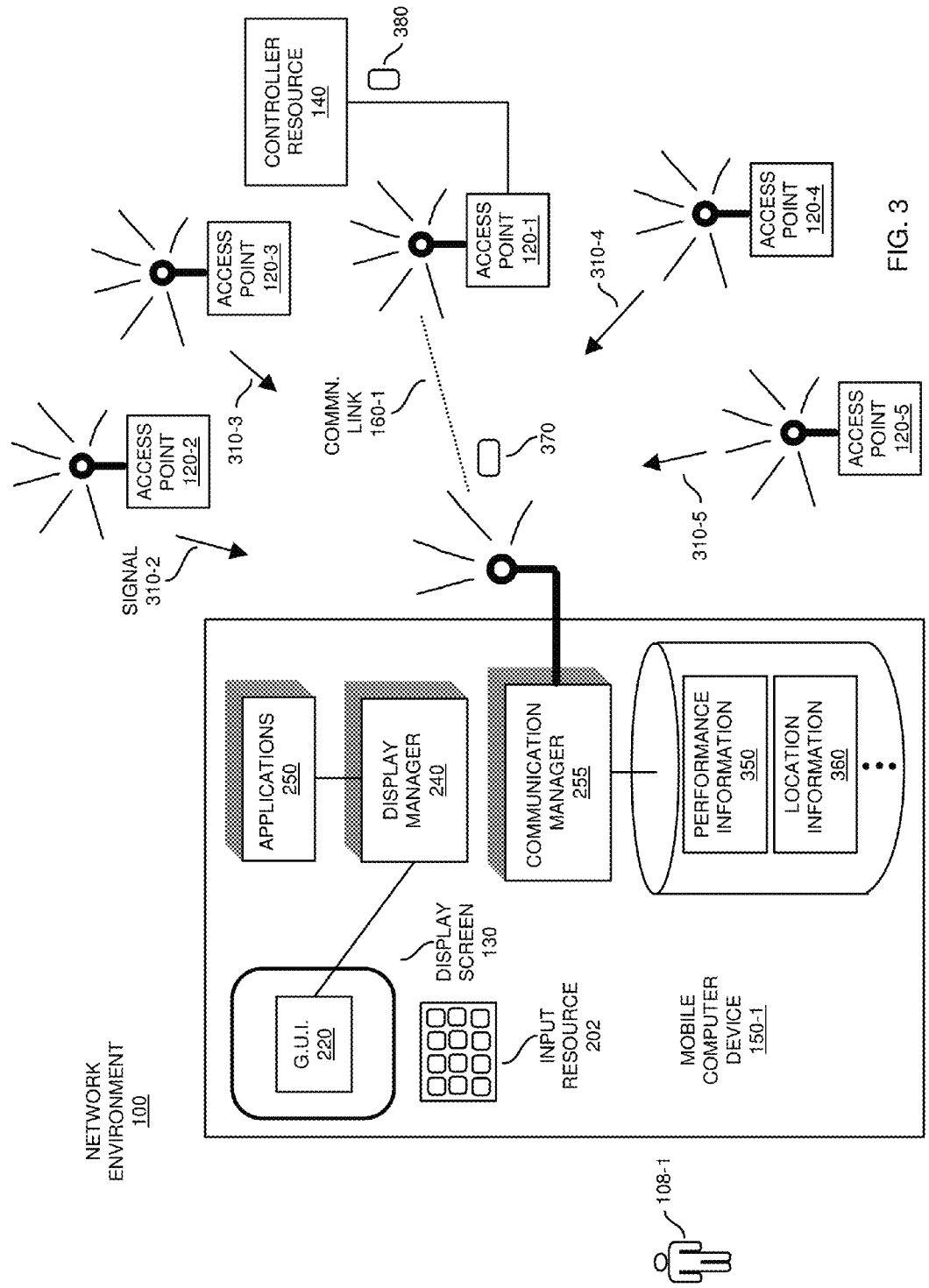
FIG. 3 is an example diagram illustrating communications between a mobile computer device and a corresponding controller resource according to embodiments herein.

FIG. 3 is an example diagram illustrating more details of a mobile computer device and communications between a mobile computer device and a corresponding controller resource according to embodiments herein.

As shown, mobile computer device 150-1 includes display screen 130, input resource 202 (such as a keyboard, mouse, touchpad, etc.), applications 250, display manager 240, and communication manager 255.

During operation, mobile computer device 150-1 executes applications 250. Applications 250 can be communicatively coupled to communication manager 255. As its name suggests, communication manager 255 manages creating a respective wireless communication link with a corresponding access point.

Subsequent to establishing communication link 160-1, communication manager 255 enables the applications 250 to retrieve content (i.e., data) from remotely located resources over communication link 160-1 in a manner as previously discussed. Display manager 240 facilitates display of information such as graphical user interface 220 displayed on display screen 130. The corresponding user 108-1 provides input through input resource 202 to control graphical user interface 220 and applications 250.

As mentioned, communication manager 255 in mobile computer device 150-1 manages communications with access points 120. After establishing wireless communication link 160-1 between the mobile computer device 150-1 and access point 120-1, the communication manager 255 monitors communications (such as one or more signals 310) from neighboring access points in a vicinity of access point 120-1 such as communications from access point 120-2, communications from access point 120-3, communications from access point 120-4, and communications from access point 120-5. In one embodiment as shown, access point 120-2 generates wireless signal 310-2 (such as one or more communications); access point 120-3 generates signal 310-3 (such as one or more communications); access point 120-4 generates signal 310-4 (such as one or more communications); access point 120-5 generates signal 310-5 (such as one or more communications); and so on. The communications conveyed via respective signals 310 can be broadcast communications in the network environment, specific communications directed to a particular mobile computer device in the network environment; general etc.

Each of the access points can be configured to occasionally or periodically transmits signals 310 (such as a beacon) in a corresponding region. In one embodiment, each of the access points generates a respective signal to indicate its presence in a corresponding region. Additionally or alternatively, note that the access points 120 can be configured to generate a respective signal (such as a beacon) in response to the communication manager 255 or other mobile computer device generating a wireless query signal to learn of other available access points.

In one embodiment, the mobile computer device 150-1 monitors signals 310 to determine whether the corresponding mobile computer device 150-1 can establish a corresponding wireless communication link with a neighboring access point. While mobile computer device 150-1 is wirelessly coupled to access point 120-1 via communication link 160-1, assume that the communication manager 255 monitors network environment 100 for neighboring access points (i.e., other access points to which the mobile computer device 150-1 can potentially wirelessly connect).

Assume during monitoring, that communication manager 255 of mobile computer device 150-1 detects presence of signal 310-2, signal 310-3, signal 310-4, and signal 310-5. In one embodiment, the communication manager 255 produces performance information 350 (as shown in FIG. 4) indicating a robustness of receiving communications from a corresponding access point. In other words, performance information 350 indicates whether it would be possible to produce a good communication link with a corresponding access point neighboring.

For example, communication manager 255 can be configured to monitor communications received from access point 120-1. Based on communications received from access point 120-1, the communications manager 255 produces performance metric information PMI #1. Performance metric information PMI #1 can include information such as RSSI (Received Signal Strength Indicator), SNR (Signal-to-Noise Ratio), channel information, access point device capability, bit error rate associated with transmitted data, transmit power, etc., associated with the communications transmitted over wireless communication link 160-1.

Based on communications such as signal 310-2 received from access point 120-2, the communications manager 255 produces performance metric information PMI #2. Performance metric information PMI #2 can include information such as RSSI (Received Signal Strength Indicator), SNR (Signal-to-Noise Ratio), channel information, data such as access point device capability, bit error rate associated with transmitted data, transmit power, etc., associated with received signal 310-2.

Based on communications such as signal 310-3 received from access point 120-3, the communications manager 255 produces performance metric information PMI #3. Performance metric information PMI #3 can include information such as RSSI (Received Signal Strength Indicator), SNR (Signal-to-Noise Ratio), channel information, data such as access point device capability, bit error rate associated with transmitted data, transmit power, etc., associated with received signal 310-3.

Based on communications such as signal 310-4 received from access point 120-4, the communications manager 255 produces performance metric information PMI #4. Performance metric information PMI #4 can include information such as RSSI (Received Signal Strength Indicator), SNR (Signal-to-Noise Ratio), channel information, data such as access point device capability, bit error rate associated with transmitted data, transmit power, etc., associated with received signal 310-4.

Based on communications such as signal 310-5 received from access point 120-5, the communications manager 255 produces performance metric information PMI #5. Performance metric information PMI #5 can include information such as RSSI (Received Signal Strength Indicator), SNR (Signal-to-Noise Ratio), channel information, data such as access point device capability, bit error rate associated with transmitted data, transmit power, etc., associated with received signal 310-5.

In addition to or as an alternative to generating performance information 350, the mobile computer device 150-1 can be configured to receive or produce location information 360. When generated locally, location information 360 can be generated in any suitable manner. For example, a mobile computer device 150-1 can be configured to include GPS (Global Positioning System) circuitry enabling the mobile computer device 150-1 to determine its specific location in a geographical region using satellites. In accordance with another embodiment, the communication manager 255 can be configured to determine its specific whereabouts in network environment 100 using triangulation methods. In this latter instance, the communication manager 255 analyzes the timing associated with receiving signals from each of multiple access points to determine its specific location in region 125-2.

Subsequent to gathering or producing performance information 350 and/or location information 360, the communication manager 255 of mobile computer device 150-1 transmits notification 370 (such as one or more communications) over wireless communication link 160-1 to access point 120-1. Access point 120-1, in turn, transmits the notification 370 over shared communication link 191 to controller resource 140.

In one embodiment, the communication manager 255 generates notification 370 to include the performance information 350 and/or location information 360 as derived from the monitored signals 310. As mentioned, the performance information 350 indicates an ability of a wireless medium between the mobile computer device 150-1 and the corresponding access point to support conveyance of wireless signals. Each of the respective wireless mediums (such as the wireless medium between mobile computer device 150-1 and access point 120-2, wireless medium between mobile computer device 150-2 and access point 120-3, wireless medium between mobile computer device 150-1 and access point 120-4, and so on) is a potential alternative to the current wireless communication link 160-1 between the mobile computer device 150-1 and access point 120-1.

Accordingly, via communications from mobile computer device 150-1, the controller resource 140 is apprised of the different neighboring access points such as access point 120-2, access point 120-3, access point 120-4, and access point 120-5 in a vicinity of mobile computer device 150-1.

As previously discussed, the controller resource 140 controls connectivity between the mobile computer devices 150 and the multiple access points 120. The performance information 350 in the notification 370 indicates an ability of the mobile computer device 150-1 to communicate with a set of neighboring access points (such as access point 120-2, access point 120-3, access point 120-4, and access point 125). That is, performance metric information PMI #1 indicates a relative ability of a wireless medium between mobile computer device 150-1 and access point 120-1 to support wireless communications; performance metric information PMI #2 indicates a relative ability of a wireless medium between mobile computer device 150-1 and access point 120-2 to support wireless communications; performance metric information PMI #3 indicates a relative ability of a wireless medium between mobile computer device 150-1 and access point 120-3 to support wireless communications; performance metric information PMI #4 indicates a relative ability of a wireless medium between mobile computer device 150-1 and access point 120-4 to support wireless communications; performance metric information PMI #5 indicates a relative ability of a wireless medium between mobile computer device 150-1 and access point 120-5 to support wireless communications.

Stated differently, the performance metric information PMI #1 as generated by communication manager 255 in the mobile computer device 150-1 can indicate an ability of the mobile computer device 150-1 to receive an RF (Radio Frequency) signal from access point 120-1; the performance metric information PMI #2 as generated by communication manager 255 in the mobile computer device 150-1 can indicate an ability of the mobile computer device 150-1 to receive an RF (Radio Frequency) signal such as signal 310-2 from access point 120-2; the performance metric information PMI #3 as generated by communication manager 255 in the mobile computer device 150-1 can indicate an ability of the mobile computer device 150-1 to receive an RF (Radio Frequency) signal such as signal 310-3 from access point 120-3; and so on.

When making decisions about handoffs, the controller resource 140 can be configured to compare performance metric information associated with each of the different access point 120. For example, in one embodiment, the controller resource 140 can compare performance metric information PMI #1 associated with access point 120-1 to PMI information associated with each of the other neighboring access points (120-2, 120-3, 120-4, and 120-5); the controller resource 140 can compare performance metric information PMI #2 associated with access point 120-2 to PMI information associated with the other neighboring access points (120-1, 120-3, 120-4, and 120-5); the controller resource 140 can compare performance metric information PMI #3 associated with access point 120-3 to PMI information associated with the other neighboring access points (120-1, 120-2, 120-4, and 120-5); and so on. In this manner, the controller resource 140 can detect which of one or more neighboring access points are best candidates for establishing a new wireless communication link in lieu of wireless communication link 160-1.

In one embodiment, in response to detecting that the access point 120-2 provides better wireless connectivity with the mobile computer device 150-1 than the access point 120-1 based on the comparing, the controller resource 140 notifies the mobile computer device 150-1 to establish the second wireless communication link 560-1 (see FIG. 5) as a replacement to wireless communication link 160-1.

In accordance with yet further embodiments, in response to receiving the performance information 350 and/or location information 360, the controller resource 140 generates control information to modify the connectivity between mobile computer device 150-1 and a corresponding access point in the network environment 100. For example, the controller resource 140 (such as controller hardware) can be configured to generate control information to initiate a handoff of the mobile computer device 150-1 from the access point 120-1 to access point 120-2 to reduce a load of mobile computer devices communicatively coupled to access point 120-1.

As a more specific example, when executing a load-balancing function, the controller resource 140 can be configured to detect based on status information 185 that too many mobile computer devices are currently connected to access point 120-1 and that access point 120-2 has a relatively light load supporting only a single mobile computer device. In response to detecting this imbalance condition, and that performance information 350 (based on signals 310-2) indicates that access point 120-2 is a good or best candidate in which the mobile computer device 150-1 can establish a corresponding new wireless communication link, the controller resource 140 generates control information indicating to terminate wireless communication link 160-1 between the mobile computer device 150-1 and the first access point 120-1. Additionally, the controller resource 140 generates control information to establish a new wireless communication link between the mobile computer device 150-1 and the access point 120-2.

Figure 5:
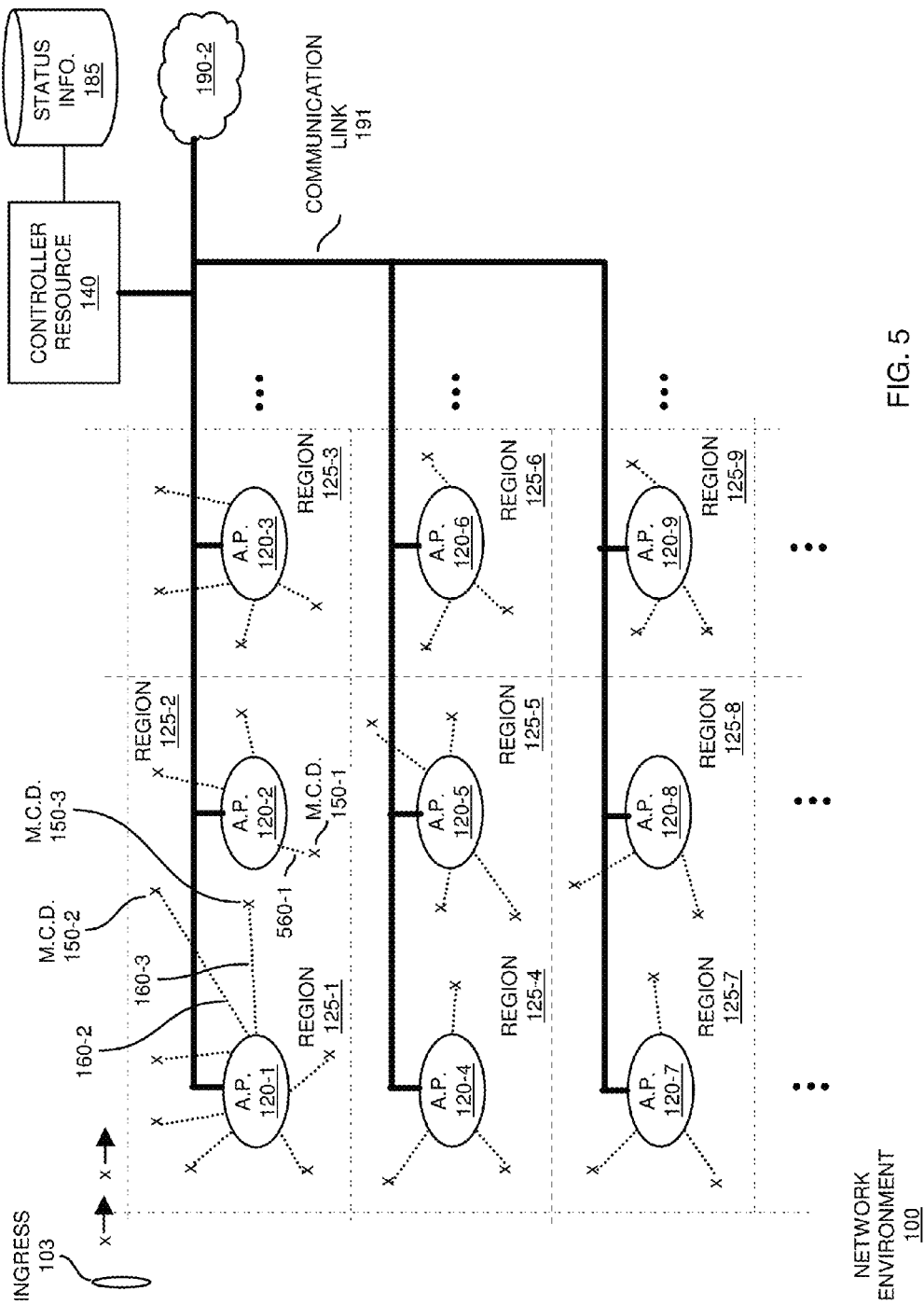
FIG. 5 is an example diagram illustrating the make-after-break type handoff including termination of a first wireless link and subsequent creation of a second wireless link according to embodiments herein.

To modify current wireless connectivity, and in accordance with the control information, via communications 380, the controller resource 140 transmits a first command to mobile computer device 150-1 to terminate the wireless communication link 160-1. Via communications 380, the controller resource 140 also transmits a second command to mobile computer device 150-1 establish a new or replacement wireless communication link 560-1 as shown in FIG. 5. By way of non-limiting example, the second command can be a message to notify the mobile computer device 150-1 to establish the second wireless communication link 560-1 subsequent to termination of the first wireless communication link 160-1.

In one embodiment, the controller resource 140 transmits the first command (termination command) over shared communication link 191 to either access point 120-1 or mobile computer device 150-1. Either access point 120-1 or mobile computer device 150-1 can be configured to execute the termination command and terminate the wireless communication link 160-1.

In response to receiving the termination command, either of the access point 120-1 or the mobile computer to base 150-1 can generate a corresponding disassociate message in order to terminate the corresponding wireless communication link 160-1. For example, to terminate wireless communication link 160-1, access point 120-1 can be configured to generate and transmit a disassociate message from access point 120-1 to mobile computer device 150-1. Alternatively, to terminate wireless communication link 160-1, the mobile computer device 150-1 can be configured to generate and transmit a disassociate message from mobile computer device 150-1 to access point 120-1.

In accordance with yet further embodiments, the mobile computer device 150-1 receives the second command (as transmitted along a path such as from the controller resource 140 over shared communication link 191 through access point 120-1 and wireless communication link 160-1 to mobile computer device 150-1) prior to termination of the wireless communication link 160-1.

As previously mentioned, the second command indicates to establish a new wireless communication link with an access point as specified by the controller resource 140 after termination of wireless communication link 160-1. In this example embodiment, assume that the second command indicates to establish the wireless communication link 560-1 between the mobile computer device 150-1 and the access point 120-2 to replace wireless communication link 160-1 which is to be terminated. Accordingly, via communications 380, the controller resource 140 notifies the mobile computer device 150-1 to establish a wireless connection (i.e., wireless communication link 560-1) with the access point 120-2 as an alternative to the wireless communication link 160-1 between the mobile computer device 150-1 and the access point 120-1.

In accordance with yet further embodiments, the mobile computer device 150-1 can be configured to produce the notification 370 to include location information 360. The communication manager 255 can be configured to forward the location information 360 in the notification 370 from the mobile computer device 150-1 through the access point 120-1 to the controller resource 140.

As previously discussed, the location information 360 indicates the current location of the mobile computer device 150-1 in the network environment 100. In this example embodiment, assume that the location information 360 indicates that mobile computer device 150-1 is located in region 125-2. The controller resource 140 can be configured to modify current wireless communication links such that a corresponding mobile computer device is wirelessly connected to an access point depending upon a region in which the mobile computer device resides. In this example embodiment, since the controller resource 140 detects that the mobile computer device 150-1 is located in region 125-2 as indicated by location information 360, the controller resource 140 generates communications 380 forcing the mobile computer device 150-12 connect to access point 120-2. As mentioned, the controller resource 140 can be configured to initiate the handoff of mobile computer device 150-1 from access point 121-1 to access point 120-2 via generation of the control information.

Thus, in summary, embodiments herein can include, at the controller resource 140, receiving location information 360 indicating a current location of the mobile computer device 150-1. The controller resource 140 analyzes the current location of the mobile computer device 150-1 with respect to wireless coverage provided by the access point 120-1 and the access point 120-2. Based on the analysis, the controller resource 140 generates the control information to drop wireless communication link 160-1 and establish wireless communication link 560-1 based at least in part in response to detecting that the mobile computer device 150-1 is substantially closer to access point 120-2 than access point 120-1.

In accordance with yet further embodiments, the controller resource 140 can be configured to receive location information 360 indicating a current location of the mobile computer device 150-1 in a manner as previously discussed. The controller resource 140 can be configured to analyze the current location of the mobile computer device with respect to other mobile computer devices in the network environment 100 and respective connectivity amongst the other mobile computer devices and the multiple access points. To perform load balancing, the controller resource 140 then generates control information to reduce how many mobile computer devices are wirelessly connected to the access point 120-1.

In a similar manner that the controller resource 140 keeps track of a location of mobile computer device 150-1 and respective wireless connectivity, the controller resource 140 can keep track of the locations associated with each of the mobile computer devices located in network environment 100. Also in a similar manner, via communications 380 from controller resource 140 to other mobile computer devices such as mobile computer device 150-2 and mobile computer device 150-3, the controller resource communicates with these mobile computer devices to drop corresponding wireless links 160-2 and 160-3 with access point 120-1 and establish corresponding wireless links with access point 120-2 instead because both mobile computer device 150-2 and mobile computer device 150-3 both reside in region 125-2. Thus, via feedback from the mobile computer devices and/or access points, the controller resource 140 analyzes and controls connectivity in network environment 100.

Note that as an alternative to specifying a specific access point in which to connect, the controller resource 140 can be configured to generate a list of possible access points representing candidate access points from which the mobile computer device 150-1 can select to establish a corresponding wireless communication link in lieu of the current wireless communication link 160-1.

More specifically, based on analyzing the received performance information 350, the controller resource 140 can determine that access point 120-2 and access point 120-5 are both good candidates in which to establish a wireless communication link with mobile computer device 150-1. The controller resource 140 produces a listing including access point 120-2 and access point 120-5 as better candidates among the neighboring access points. The controller resource 140 transmits the listing via communications 380 to communication manager 255.

The communication manager 255 receives the listing of candidate access points from the controller resource 140 (such as on a path through shared communication link 191, access point 120-1, and wireless communication link 160-1) prior to termination of the wireless communication link 160-1. The mobile computer device 150-1 selects an access point from the listing. Assume that the mobile computer device 150-1 selects access point 120-5 in which to make a new wireless connection. Subsequent to termination of the wireless communication link 160-1 (as initiated by access point 120-1 or mobile computer device 150-1), the mobile computer device 150-1 initiates communications with the selected access point (i.e., access point 120-5) in the listing to establish a new wireless connection with the selected access point to replace the terminated wireless communication link 160-1.

FIG. 6 is an example diagram illustrating updated status information indicating the number of mobile communication devices that are connected to each of multiple access points according to embodiments herein.

In a manner as previously discussed, the controller resource 140 can be configured to initiate a handoff of a wireless communication link from access point 120-1 to access point 120-2 to reduce loading on access point 120-1. Subsequent to the handoff of a wireless link as discussed above, the controller resource 140 continues to receive feedback from the corresponding access points 120 and or mobile computer devices 150 in network environment 100. Based on the feedback, and detecting occurrence of the handoff of the mobile computer device 150-1 to access point 120-2, the controller resource 140 updates status information 185 to indicate that fewer mobile computer devices (i.e., 7 mobile computer devices) are connected to access point 120-1 and a greater number of mobile computer devices (i.e., 2 mobile computer devices) are connected to access point 120-2. As previously discussed, the controller resource 140 can continuously receive feedback and modify current wireless connectivity in the network environment 100 such that available wireless bandwidth is efficiently used.

Figure 7:
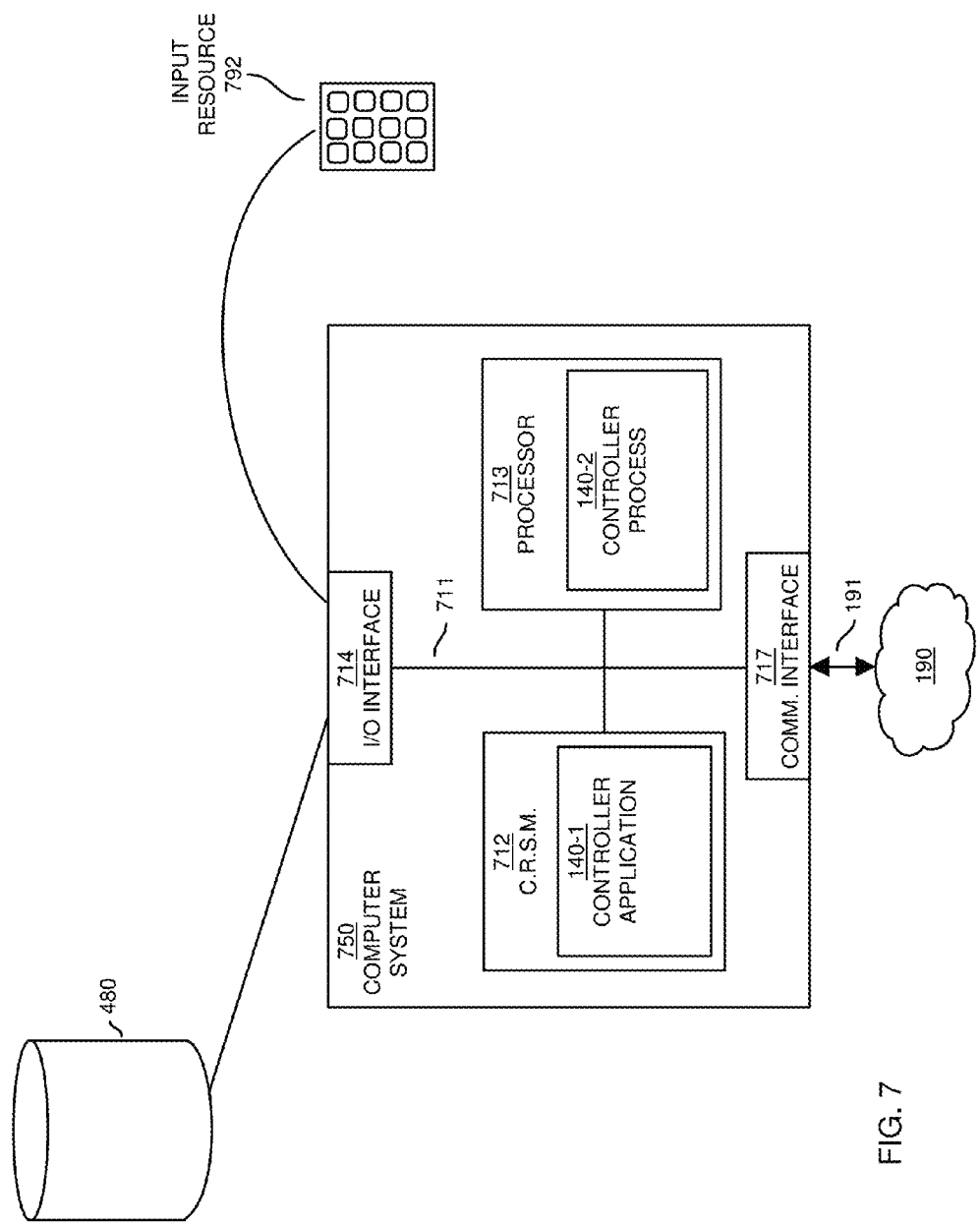
FIG. 7 is a diagram illustrating an example computer architecture in which to execute any of the functionality according to embodiments herein.

FIG. 7 is a diagram illustrating an example computer architecture in which to execute any of the functionality according to embodiments herein. Any of the different processing operations as executed by controller resource 140, mobile communication devices 150, access points 120, etc., can be implemented via execution of software code on a computer system.

For example, as shown, computer system 750 (e.g., computer processor hardware) of the present example can include an interconnect 711 that couples computer readable storage media 712 such as a non-transitory type of media (i.e., any type of hardware storage medium) in which digital information can be stored and retrieved. The computer system 750 can further include processor resource 713 (i.e., computer processor hardware such as one or more co-located or disparately located processor devices), I/O interface 714, communications interface 717, etc.

Computer processor hardware (i.e., processor 713) can be located in a single location or can be distributed amongst multiple locations.

As its name suggests, I/O interface 714 provides connectivity to external resources such as storage devices (such as storage device 480), control devices (such as input resource 792), one or more display screens, etc.

Computer readable storage medium 712 can be any hardware storage device to store data such as memory, optical storage, hard drive, floppy disk, etc. In one embodiment, the computer readable storage medium 712 stores instructions and/or data.

Communications interface 717 enables the computer system 750 and processor resource 713 to communicate over a resource such as any of networks 190, shared communication link 191, etc. I/O interface 714 enables processor resource 713 to access data from a local or remote location, control a respective display screen, receive input, etc.

As shown, computer readable storage media 712 can be encoded with controller application 140-1 (e.g., software, firmware, etc.) executed by processor resource 713. Controller application 140-1 can be configured to include instructions to implement any of the operations as discussed herein.

During operation of one embodiment, processor resource 713 accesses computer readable storage media 712 via the use of interconnect 711 in order to launch, run, execute, interpret or otherwise perform the instructions in controller application 140-1 stored on computer readable storage medium 712.

Execution of the controller application 140-1 produces processing functionality such as controller process 140-2 in processor resource 713. In other words, the controller process 140-2 associated with processor resource 713 represents one or more aspects of executing controller application 140-1 within or upon the processor resource 713 in the computer system 750.

Those skilled in the art will understand that the computer system 750 can include other processes and/or software and hardware components, such as an operating system that controls wireless connectivity in network environment 100.

In accordance with different embodiments, note that computer system may be any of various types of devices, including, but not limited to, a set-top box, access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

The computer system 750 may reside at any location or multiple locations in network environment 100. The computer system 750 can be included in any suitable resource in network environment 100 to implement functionality as discussed herein.

Note that each of the other functions as discussed herein can be executed in a respective computer system based on execution of corresponding instructions.

Figure 8:
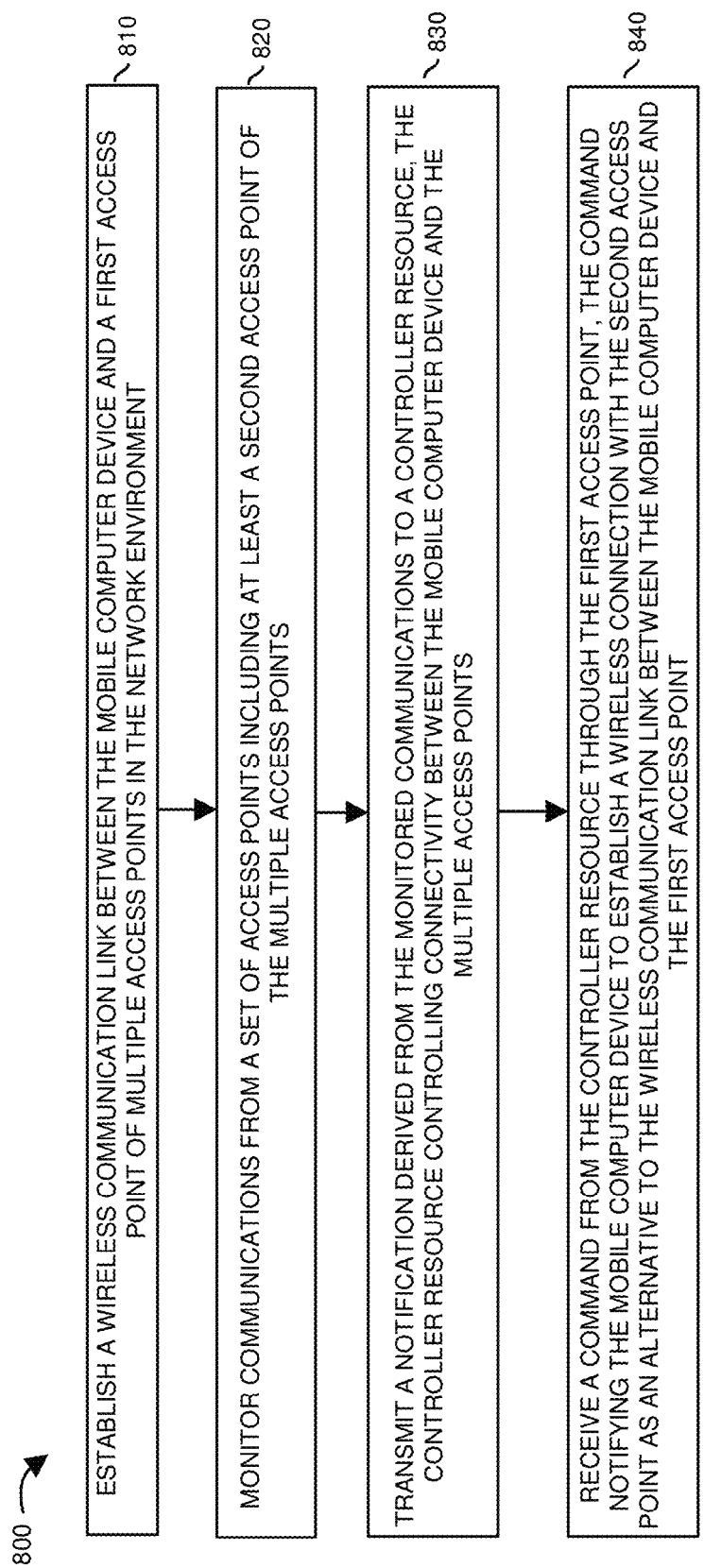
FIG. 8 is an example diagram illustrating a method of controlling network access from the perspective of a corresponding mobile computer device according to embodiments herein.

FIG. 8 is a flowchart 800 illustrating an example method according to embodiments herein. Note that there will be some overlap with respect to concepts as discussed above. The processing in the flowcharts below can be executed in any suitable order.

In processing block 810, the mobile computer device 150-1 establishes a wireless communication link 160-1 between the mobile computer device 150-1 and a first access point 120-1 of multiple access points 120 in the network environment 100.

In processing block 820, the mobile computer device 150-1 monitors communications (such as signals 310) from a set of access points 120 including at least neighboring access point 120-2.

In processing block 830, the mobile computer device 150-1 transmits a notification 370 derived from the monitored communications (such as signals 310) to controller resource 140. As discussed herein, the controller resource 140 controls connectivity between the mobile computer device 150-1 and the multiple access points 120.

In processing block 840, the mobile computer device 150-1 receives a command from the controller resource 140 through the first access point 120-1. The command indicates to the mobile computer device 150-1 to establish the wireless connection 560-1 with the second access point 120-2 as an alternative to the wireless communication link 160-1 between the mobile computer device 150-1 and the first access point 120-1.

Figure 9:
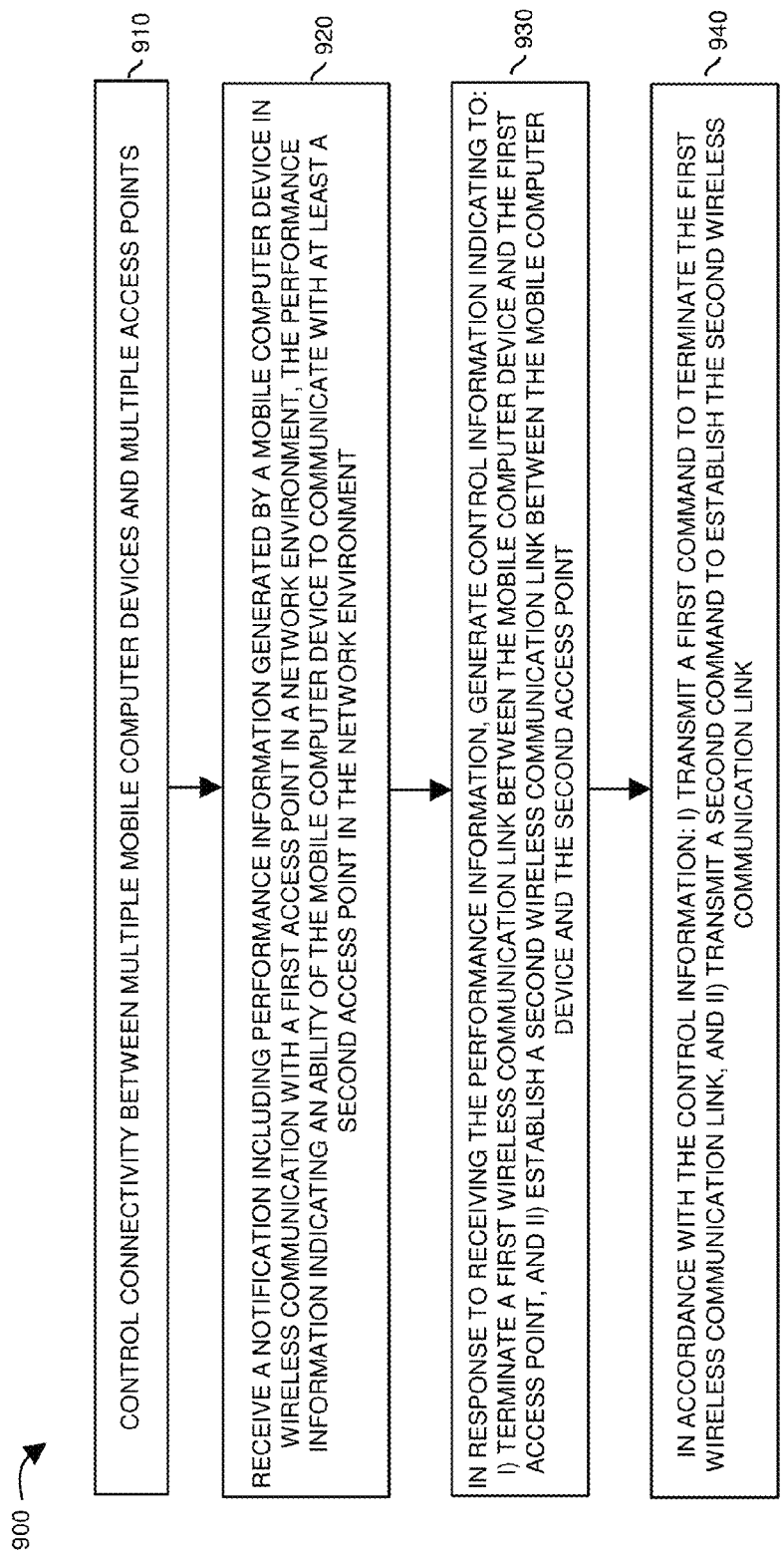
FIG. 9 is an example diagram illustrating a method of controlling network access from the perspective of a corresponding controller resource according to embodiments herein.

FIG. 9 is a flowchart 900 illustrating an example method according to embodiments. Note that there will be some overlap with respect to concepts as discussed above. The processing in the flowcharts below can be executed in any suitable order.

In processing block 910, the controller resource 140 controls connectivity between multiple mobile computer devices 150 and multiple access points 120.

In processing block 920, the controller resource 140 receives notification 370 (i.e., communications from mobile computer device 150-1). In one embodiment, the notification 370 includes all or a portion of performance information 350 generated by a mobile computer device 150-1 in network environment 100. As previously discussed, the mobile computer device 150-1 initially can be in wireless communication (via wireless communication link 160-1) with a first access point 120-1 in network environment 100. The performance information 350 as indicates an ability of the mobile computer device to communicate with at least a second access point 120-2 in the network environment 100.

In processing block 930, in response to receiving the performance information 350, the controller resource 140 generates control information indicating to: i) terminate a first wireless communication link 160-1 between the mobile computer device 150-1 and the first access point 120-1, and ii) establish a second wireless communication link 560-1 between the mobile computer device 150-1 and the second access point 120-2 as a replacement to wireless communication link 160-1.

In processing block 940, in accordance with the control information, the controller resource 140: i) transmits a first command to terminate the first wireless communication link 160-1, and ii) transmits a second command to establish the second wireless communication link 560-1. As discussed herein, the mobile computer device 150-1 can receive the second command through access point 120-1 prior to termination of the first wireless communication link 160-1.

Note again that techniques herein are well suited to perform network access management. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   at a mobile computer device in a network environment:
   establishing a wireless communication link between the mobile computer device and a first access point of multiple access points in the network environment;
   monitoring communications from a set of access points including at least a second access point of the multiple access points; and
   transmitting a notification derived from the monitored communications to a controller resource, the controller resource operable to utilize the notification derived from the monitored communications to control connectivity between the mobile computer device and the multiple access points;
   the method further comprising:
   producing the notification to include location information;
   forwarding the notification from the mobile computer device through the first access point to the controller resource, the location information indicating a current location of the mobile computer device in the network environment; and
   wherein the controller resource is operable to analyze the current location of the mobile computer device with respect to a corresponding first load of mobile communication devices supported by the first access point and a corresponding second load of mobile communication devices supported by the second access point, the controller resource further operable to reduce loading on the first access point by initiating a handoff of the mobile computer device from the first access point to the second access point.

2. The method as in claim 1 further comprising:
   generating the notification transmitted from the mobile computer device to the controller resource to include performance information indicating an ability of a wireless medium between the mobile computer device and the second access point to support conveyance of wireless signals, the wireless medium being a potential alternative to the wireless communication link between the mobile computer device and the first access point.

3. The method as in claim 2 further comprising:
   receiving a command from the controller resource through the first access point, the command notifying the mobile computer device to establish a wireless connection with the second access point as an alternative to the wireless communication link between the mobile computer device and the first access point.

4. The method as in claim 1 further comprising:
   in response to transmitting the notification from the mobile computer device, receiving a command at the mobile computer device from the controller resource through the first access point, the command notifying the mobile computer device to establish a new wireless connection with the second access point, the new wireless connection being a substitute for the wireless communication link to handoff the mobile computer device from the first access point to the second access point.

5. The method as in claim 4 further comprising:
   subsequent to the termination of the wireless communication link between the mobile computer device and the first access point, establishing the new wireless connection between the mobile computer device and the second access point as indicated by the command.

6. The method as in claim 1 further comprising:
   subsequent to transmitting the notification to the controller resource, receiving a disassociate message at the mobile computer device, the disassociate message received from the first access point, the first access point generating the disassociate message to the mobile computer device in accordance with a command received from the controller resource to terminate the wireless communication link between the first access point and the mobile computer device.

7. The method as in claim 1, wherein monitoring the communications includes: i) detecting an ability to receive an RF signal from the second access point in the network environment, and ii) detecting an ability to receive an RF signal from a third access point in the network environment, the method further comprising:
   generating first performance metric information, the first performance metric information generated by the mobile computer device based on the detected ability to receive the RF signal from the second access point;
   generating second performance metric information, the second performance metric information generated by the mobile computer device based on the detected ability to receive the RF signal from the third access point; and
   forwarding the first performance metric information and the second performance metric information in the notification to the controller resource, the controller resource operable to handoff the mobile computer device to the second access point based on an analysis of the first performance metric information and second performance metric information in view of a corresponding location of the mobile computer device in the network environment.

8. The method as in claim 1, wherein the notification includes a first performance metric and a second performance metric, the first performance metric indicating a corresponding signal strength of communications received by the mobile computer device from the first access point, the second performance metric indicating a corresponding signal strength of communications received by the mobile communication device from the second access point; and
   wherein the controller resource is operable to handoff the mobile computer device from the first access point to the second access point based on an analysis of the first performance metric and the second performance metric in view of a detected corresponding location of the mobile computer device in the network environment.

9. The method as in claim 8, wherein the controller resource is further operable to initiate handoff the mobile computer device from the first access point to the second access point based at least in part on detecting a load imbalance indicating that the first access point supports more wireless communication links with respective mobile computer devices than the second access point.

10. The method as in claim 1 further comprising:
    analyzing a current location of the mobile computer device with respect to other mobile computer devices in the network environment; and
    generating the control information to reduce how many mobile computer devices are wirelessly connected to the first access point.

11. A method comprising:
    via controller hardware, performing operations of:
    receiving a notification including performance information generated by a mobile computer device in wireless communication with a first access point in a network environment, the performance information indicating an ability of the mobile computer device to communicate with at least a second access point in the network environment; and in response to receiving the performance information, generating control information indicating to: i) terminate a first wireless communication link between the mobile computer device and the first access point, and ii) establish a second wireless communication link between the mobile computer device and the second access point;

the method further comprising:

analyzing a current location of the mobile computer device in the network environment and a load of mobile computer devices in wireless communication with the first wireless access point; and based at least in part on the notification received from the mobile computer device, producing the control information to handoff the mobile computer device from the first access point to the second access point to reduce a number of mobile computer devices that are wirelessly connected to the first access point.

12. The method as in claim 11 further comprising:
in accordance with the control information: i) transmitting a first command to the first access point, the first command indicating to terminate the first wireless communication link, and ii) transmitting a second command to the mobile computer device, the second command indicating to establish the second wireless communication link subsequent to termination of the first wireless communication link.

13. The method as in claim 11, wherein the first command notifies the first access point to generate a disassociate message to the mobile computer device to terminate the first wireless communication link; and wherein the second command notifies the mobile computer device to establish the second wireless communication link with the second access point after termination of the first wireless communication link.

14. The method as in claim 11 further comprising:
in accordance with the control information, transmitting a message to notify the mobile computer device to establish the second wireless communication link subsequent to termination of the first wireless communication link.

15. The method as in claim 11, wherein each of the first wireless communication link and the second wireless communication link is a Wi-Fi™ communication link; and wherein the controller hardware generates the control information to initiate a handoff of the mobile computer device from the first access point to the second access point.

16. The method as in claim 11, wherein the received performance information includes: i) first performance metric information generated by the mobile computer device, the first performance metric information indicating an ability of the mobile computer device to receive an RF signal from the second access point in the network environment, and ii) second performance metric information generated by the mobile computer device, the second performance metric information indicating an ability of the mobile computer device to receive an RF signal from a third access point in the network environment.

17. The method as in claim 16 further comprising:
comparing the first performance metric information and the second performance metric information; and in response to detecting that the second access point provides better wireless connectivity with the mobile computer device than the second access point based on the comparing, notifying the mobile computer device to establish the second wireless communication link with the second access point.

18. The method as in claim 11 further comprising:
receiving location information indicating the current location of the mobile computer device in the network environment;

analyzing the current location of the mobile computer device with respect to wireless coverage provided by the first access point and the second access point; and generating the control information based at least in part in response to detecting that the mobile computer device is substantially closer to the second access point than the first access point.

19. The method as in claim 11 further comprising:
receiving location information indicating that the mobile computer device is currently in communication with the first access point;

analyzing a current location of the mobile computer device in the network environment with respect to a group of multiple mobile computer devices in wireless communication with the first wireless access point; and based at least in part on detecting that the first wireless access point is overloaded supporting the group of mobile computer devices, producing the control information to handoff the mobile computer device from the first access point to the second access point to reduce how many mobile computer devices are wirelessly connected to the first access point.

20. A method comprising:
via controller hardware, performing operations of:
receiving a notification including performance information generated by a mobile computer device in wireless communication with a first access point in a network environment, the performance information indicating an ability of the mobile computer device to communicate with at least a second access point in the network environment; and in response to receiving the performance information, generating control information indicating to: i) terminate a first wireless communication link between the mobile computer device and the first access point, and ii) establish a second wireless communication link between the mobile computer device and the second access point;

receiving location information indicating a current location of the mobile computer device in the network environment;

analyzing the current location of the mobile computer device with respect to other mobile computer devices in the network environment and respective connectivity amongst the other mobile computer devices and the multiple access points; and generating the control information to reduce how many mobile computer devices are wirelessly connected to the first access point.

21. A system comprising:
computer processor hardware; and
a hardware storage resource coupled to communicate with the computer processor hardware, the hardware storage resource storing instructions that, when executed by the computer processor hardware, causes the computer processor hardware to perform operations of:
receiving a notification including performance information generated by a mobile computer device in wireless communication with a first access point in a network environment, the performance information indicating an ability of the mobile computer device to communicate with at least a second access point in the network environment; and in response to receiving the performance information, generating control information indicating to: i) terminate a first wireless communication link between the mobile computer device and the first access point, and ii) establish a second wireless communication link between the mobile computer device and the second access point;

wherein the computer processor hardware further performs operations of:

receiving location information indicating a current location of the mobile computer device in the network environment;

analyzing the current location of the mobile computer device with respect to other mobile computer devices in the network environment and respective connectivity amongst the other mobile computer devices and the multiple access points; and generating the control information to reduce how many mobile computer devices are wirelessly connected to the first access point.

22. The computer system as in claim 21, wherein the control information includes a first command and a second command;

wherein the first command notifies the first access point to generate a disassociate message to the mobile computer device to terminate the first wireless communication link; and wherein the second command notifies the mobile computer device to establish the second wireless communication link with the second access point after termination of the first wireless communication link.

23. The computer system as in claim 21, wherein the computer processor hardware further performs operations of:

in accordance with the control information, transmitting a message to notify the mobile computer device to establish the second wireless communication link subsequent to termination of the first wireless communication link.

24. The computer system as in claim 21, wherein the received performance information includes: i) first performance metric information generated by the mobile computer device, the first performance metric information indicating an ability of the mobile computer device to receive an RF signal from the second access point in the network environment, and ii) second performance metric information generated by the mobile computer device, the second performance metric information indicating an ability of the mobile computer device to receive an RF signal from a third access point in the network environment.

25. The computer system as in claim 24, wherein the computer processor hardware further performs operations of:

comparing the first performance metric information and the second performance metric information; and in response to detecting that the second access point provides better wireless connectivity with the mobile computer device than the second access point based on the comparing, notifying the mobile computer device to establish the second wireless communication link with the second access point.

26. The computer system as in claim 21, wherein the computer processor hardware further performs operations of:

generating the control information based at least in part in response to detecting that the mobile computer device is substantially closer to the second access point than the first access point.

27. Computer-readable hardware storage having instructions stored thereon, the instructions, when carried out by computer processor hardware, causing the computer processor hardware to perform operations of:

establishing a wireless communication link between the mobile computer device and a first access point of multiple access points in the network environment;

monitoring communications from a set of access points including at least a second access point of the multiple access points; and transmitting a notification derived from the monitored communications to a controller resource, the controller resource controlling connectivity between the mobile computer device and the multiple access points;

producing the notification to include location information, and forwarding the notification from the mobile computer device through the first access point to the controller resource, the location information indicating a current location of the mobile computer device in the network environment;

wherein the controller resource is operable to analyze the current location of the mobile computer device with respect to a corresponding first load of mobile communication devices supported by the first access point and a corresponding second load of mobile communication devices supported by the second access point, the controller resource further operable to reduce loading on the first access point by initiating a handoff of the mobile computer device from the first access point to the second access point.

28. A method comprising:

at a mobile computer device in a network environment:

establishing a wireless communication link between the mobile computer device and a first access point of multiple access points in the network environment;

monitoring communications from a set of access points including at least a second access point of the multiple access points; and transmitting a notification derived from the monitored communications to a controller resource, the controller resource operable to utilize the notification derived from the monitored communications to control connectivity between the mobile computer device and the multiple access points;

at the controller resource:

utilizing the notification to identify a current location of the mobile computer device in the network environment; and based on an analysis of the current location of the mobile computer device with respect to other mobile computer devices in the network environment and respective connectivity amongst the other mobile computer devices and the multiple access points, generating the control information to reduce how many mobile computer devices are wirelessly connected to the first access point.

29. A method comprising:

via controller hardware, performing operations of:

receiving a notification including performance information generated by a mobile computer device in wireless communication with a first access point in a network environment, the performance information indicating an ability of the mobile computer device to communicate with at least a second access point in the network environment; and in response to receiving the performance information, generating control information indicating to: i) terminate a first wireless communication link between the mobile computer device and the first access point, and ii) establish a second wireless communication link between the mobile computer device and the second access point;

wherein the notification indicates a current location of the mobile computer device in the network environment, the method further comprising:

analyzing the current location of the mobile computer device with respect to other mobile computer devices in the network environment and respective connectivity amongst the other mobile computer devices and the multiple access points; and generating the control information to handoff the wireless communication link to the second access point, reducing a load of mobile computer devices wirelessly connected to the first access point.

* * * * *